US011618581B2

(12) United States Patent
Colavincenzo et al.

(10) Patent No.: US 11,618,581 B2
(45) Date of Patent: Apr. 4, 2023

(54) SYNCHRONIZATION OF AIRCRAFT ENGINES

(71) Applicant: BOMBARDIER INC., Dorval (CA)

(72) Inventors: Stephen Colavincenzo, Toronto (CA); Andre Brodeur, Laval (CA); Alexis Caron L'Ecuyer, Lachine (CA); Mirel Bogdan, Caledon East (CA); Dragan Jovicic, Oakville (CA)

(73) Assignee: BOMBARDIER INC., Dorval (CA)

( * ) Notice: Subject to any disclaimer, the term of this patent is extended or adjusted under 35 U.S.C. 154(b) by 161 days.

(21) Appl. No.: 17/238,894

(22) Filed: Apr. 23, 2021

(65) Prior Publication Data
US 2021/0237889 A1 Aug. 5, 2021

Related U.S. Application Data

(63) Continuation of application No. 16/386,678, filed on Apr. 17, 2019, now Pat. No. 11,014,682, which is a
(Continued)

(51) Int. Cl.
*B64D 31/12* (2006.01)
*F02C 9/18* (2006.01)
(Continued)

(52) U.S. Cl.
CPC ............... *B64D 31/12* (2013.01); *F02C 9/18* (2013.01); *F02C 9/28* (2013.01); *F02C 9/42* (2013.01); *F05D 2220/323* (2013.01)

(58) Field of Classification Search
None
See application file for complete search history.

(56) References Cited

U.S. PATENT DOCUMENTS 4,875,168 A 10/1989 Martin
5,221,185 A 6/1993 Pla et al.
(Continued)

FOREIGN PATENT DOCUMENTS

EP 1215383 A1 6/2002
GB 2225134 A 5/1990

OTHER PUBLICATIONS

International Searching Authority, PCT international Search Report and Written Opinion dated Jun. 13, 2016 re: International Patent Application No. PCT/IB2016/051278.
(Continued)

*Primary Examiner* — Todd Melton
(74) *Attorney, Agent, or Firm* — Norton Rose Fulbright Canada LLP

(57) ABSTRACT

Methods and related apparatus for improving synchronization of two or more engines on an aircraft are disclosed. Such method may be used where each engine comprises a first spool and a second spool, and, where a rotational speed of a first spool of a first engine has been substantially synchronized with a rotational speed of a first spool of a second engine. An exemplary method comprises receiving a value of a sensed parameter useful in controlling the first engine; adding a bias to the value; and using the biased value for controlling the first engine to cause a change in rotational speed of the second spool of the first engine in relation to the rotational speed of the first spool of the first engine.

23 Claims, 11 Drawing Sheets

Related U.S. Application Data continuation of application No. 15/557,871, filed as application No. PCT/IB2016/051278 on Mar. 7, 2016, now Pat. No. 10,301,031.

(60) Provisional application No. 62/169,125, filed on Jun. 1, 2015, provisional application No. 62/133,656, filed on Mar. 16, 2015.

(51) Int. Cl.
*F02C 9/28* (2006.01)
*F02C 9/42* (2006.01)

(56) References Cited

U.S. PATENT DOCUMENTS

| | | | |
|---|---|---|---|
| 5,453,943 A * | 9/1995 | Magliozzi | B64C 11/50 |
| | | | 416/34 |
| 5,789,678 A * | 8/1998 | Pla | B64C 11/50 |
| | | | 416/34 |
| 6,712,314 B2 | 3/2004 | Stephan | |
| 8,489,306 B2 | 7/2013 | Sahm et al. | |
| 9,695,752 B2 | 7/2017 | Chapman | |
| 10,254,773 B2 * | 4/2019 | Winzenz | B64D 31/12 |
| 2011/0288740 A1 | 11/2011 | Sahm et al. | |
| 2014/0150550 A1 | 6/2014 | Borwankar et al. | |

OTHER PUBLICATIONS

English translation of European patent document No. EP 1215383 A1 dated Jun. 19, 2002, http://www.google.com.na/patents/EP1215383A1?cl=en, accessed on Aug. 24, 2017.

Zhu Zhili, Working Principle and Performance of Aircraft Gas Turbine Engines, pp. 84-105, Shanghai Jiao Tong University Press, Aug. 2014.

China National Intellectual Property Administration, Office Action for CN Patent Application No. 201680016137.3 dated Aug. 7, 2019.

* cited by examiner

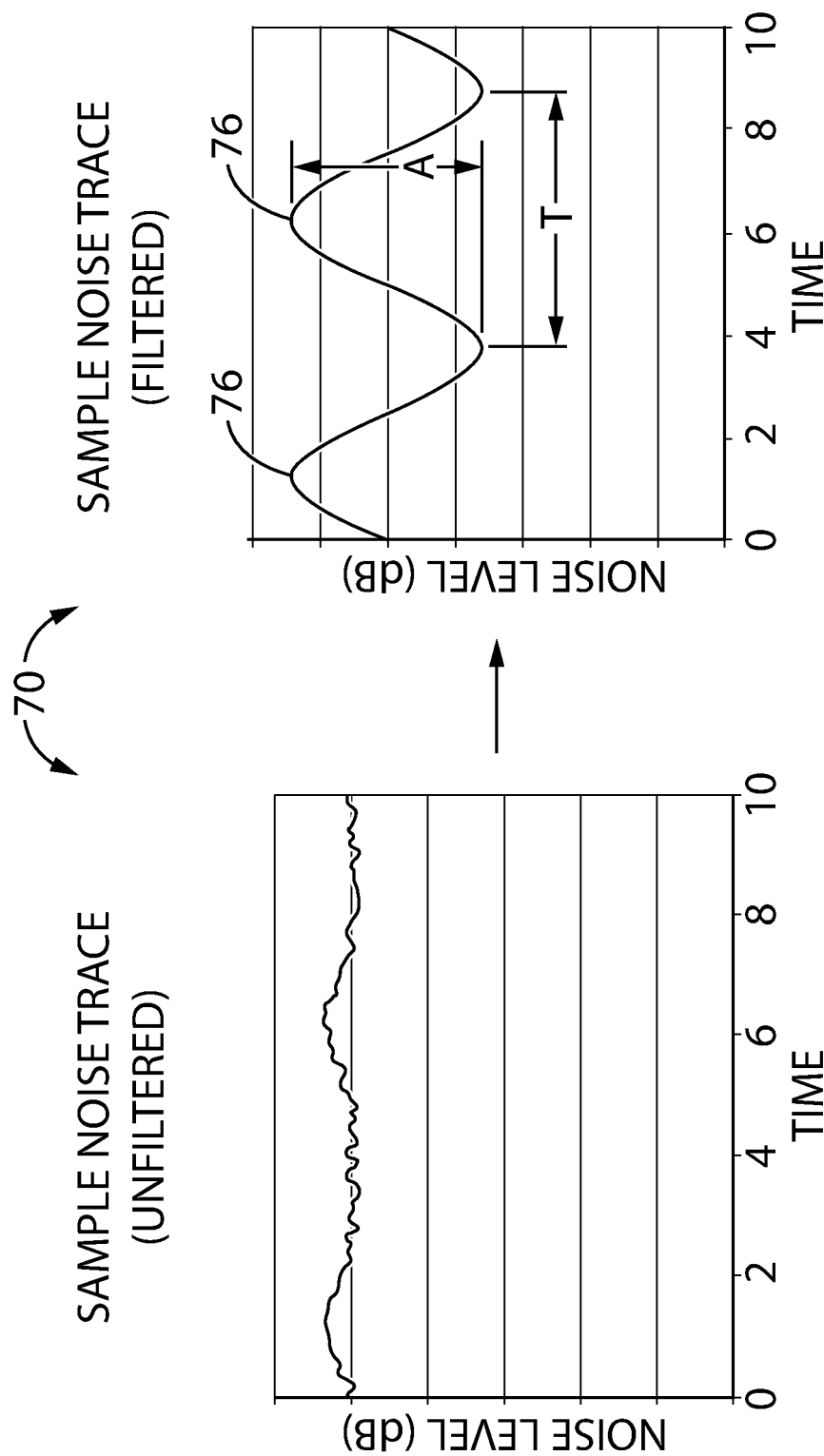

700

```
┌─────────────────────────────┐
│ RECEIVING A VALUE OF A SENSED │
│ PARAMETER USEFUL IN CONTROLLING│
│        A FIRST ENGINE         │
│             702               │
└─────────────────────────────┘
              │
              ▼
┌─────────────────────────────┐
│   ADDING A BIAS TO THE VALUE  │
│             704               │
└─────────────────────────────┘
              │
              ▼
┌─────────────────────────────┐
│   USING THE BIASED VALUE FOR  │
│  CONTROLLING THE FIRST ENGINE │
│             706               │
└─────────────────────────────┘
```

```
┌─────────────────────────────────────────────────────────┐
│  RECEIVING ACOUSTIC FEEDBACK INDICATIVE OF THE SECOND SPOOL │
│  OF THE FIRST ENGINE AND THE SECOND SPOOL OF THE SECOND ENGINE │
│         HAVING DIFFERENT ROTATIONAL SPEEDS              │
│                          902                            │
└─────────────────────────────────────────────────────────┘
                            │
                            ▼
┌─────────────────────────────────────────────────────────┐
│   DETERMINING, BASED ON THE ACOUSTIC FEEDBACK, A BIAS   │
│   TO BE ADDED TO A SENSED PARAMETER USEFUL IN CONTROLLING │
│                    THE FIRST ENGINE                     │
│                          904                            │
└─────────────────────────────────────────────────────────┘
                            │
                            ▼
┌─────────────────────────────────────────────────────────┐
│  GENERATING AN OUPUT CONFIGURED TO INSTRUCT A CONTROLLER │
│  OF THE FIRST ENGINE TO USE THE BIAS WITH THE SENSED PARAMETER FOR │
│                    THE FIRST ENGINE                     │
│                          906                            │
└─────────────────────────────────────────────────────────┘
```

```
┌─────────────────────────────────────────────────────────────┐
│ RECEIVING VIBRATION FEEDBACK FROM EACH ENGINE INDICATIVE OF THE │
│ SECOND SPOOL OF THE FIRST ENGINE AND THE SECOND SPOOL OF THE │
│ SECOND ENGINE HAVING DIFFERENT ROTATIONAL SPEEDS             │
│                         1002                                 │
└─────────────────────────────────────────────────────────────┘
                              ↓
┌─────────────────────────────────────────────────────────────┐
│ DETERMINING, BASED ON THE VIBRATION FEEDBACK, A BIAS         │
│ TO BE ADDED TO A SENSED PARAMETER USEFUL IN CONTROLLING      │
│                  THE FIRST ENGINE                            │
│                         1004                                 │
└─────────────────────────────────────────────────────────────┘
                              ↓
┌─────────────────────────────────────────────────────────────┐
│ GENERATING AN OUPUT CONFIGURED TO INSTRUCT A CONTROLLER      │
│ OF THE FIRST ENGINE TO USE THE BIAS WITH THE SENSED PARAMETER FOR │
│                CONTROLLING THE FIRST ENGINE                  │
│                         1006                                 │
└─────────────────────────────────────────────────────────────┘
```

FIG. 10

SYNCHRONIZATION OF AIRCRAFT ENGINES

CROSS-REFERENCE TO RELATED APPLICATION(S)

The present application is a continuation of U.S. patent application Ser. No. 16/386,678 filed on Apr. 17, 2019 and incorporated herein by reference, which is a continuation of U.S. patent application Ser. No. 15/557,871 filed on Mar. 7, 2016 and incorporated herein by reference, which is a national stage application under 35 U.S.C. 371 of International Patent Application No. PCT/IB2016/051278 filed on Mar. 7, 2016 and incorporated herein by reference, which claims priority to U.S. Provisional Patent Application Nos. 62/133,656 filed on Mar. 16, 2015 and 62/169,125 filed on Jun. 1, 2015, the entire contents of both of which are hereby incorporated herein by reference.

TECHNICAL FIELD

The disclosure relates generally to aircraft engine synchronization and more particularly to the synchronization of multi-spool engines on aircraft having at least two engines.

BACKGROUND OF THE ART

Engine synchronization on multi-engine aircraft is known. Existing synchronization methods for dual-spool gas turbine engines typically involve adjusting the rotational speed of a low or high pressure spool of a first engine to substantially match the rotational speed of the corresponding low or high pressure spool of a second engine. Such adjustments can be done via throttle adjustments for the engine on which the rotational speed of the low or high pressure spool is being adjusted. One concern with this method is that it only synchronizes one spool of one engine with one spool of the other engine. Any difference in rotational speeds between the other, unsynchronized spools of each engine is not considered. Depending on its magnitude, the difference in rotational speed between the other unsynchronized spools of the engines can in some situations cause audible noise beats (amplitude modulations) inside of the aircraft cabin. Such noise beats could be unpleasant to aircraft passengers.

SUMMARY

In one aspect, the disclosure describes a method for improving synchronization of two engines on an aircraft where each engine comprises a first spool and a second spool, and, where a rotational speed of a first spool of a first engine has been substantially synchronized with a rotational speed of a first spool of a second engine. The method comprises:

receiving a value of a sensed parameter useful in controlling the first engine, the sensed parameter being indicative of one of altitude and a flow of bleed air from the first engine;

adding a bias to the value; and using the biased value for controlling the first engine to cause a change in rotational speed of the second spool of the first engine in relation to the rotational speed of the first spool of the first engine and thereby reduce a difference in rotational speed between the second spool of the first engine and the second spool of the second engine.

The method may comprise determining the bias based on a difference in rotational speed between the second spool of the first engine and the second spool of the second engine.

The method may comprise determining the bias based on the value of the sensed parameter.

The method may comprise receiving feedback indicative of the difference in rotational speed between the second spool of the first engine and the second spool of the second engine.

The feedback may be based on a vibration measurement acquired on the aircraft.

The feedback may be based on an acoustic measurement acquired from inside of a cabin of the aircraft. The acoustic feedback may be indicative of a period of audible beats inside of the cabin of the aircraft.

The feedback may be based on a first vibration measurement acquired from the first engine and a second vibration measurement acquired from the second engine. For example, the feedback may be based on a combination of the first vibration measurement and of the second vibration measurement.

The method may comprise determining the bias based on the feedback.

The method may comprise determining a preferred synchronization time based on the feedback and using the biased value for controlling the first engine based on the preferred synchronization time. The preferred synchronization time may correspond to a preferred phase angle between the second spool of the first engine and the second spool of the second engine. The feedback may be indicative of a first time corresponding to a higher noise level and a second time corresponding to a lower noise level where the preferred synchronization time corresponds to the time of the lower noise level.

The bias may be a constant bias for use for a plurality of flight cycles of the aircraft.

The method may comprise receiving the bias from a pilot of the aircraft. The method may comprise determining the bias automatically using a feedback loop.

In another aspect, the disclosure describes a method for improving synchronization of two engines on an aircraft where each engine comprises a first spool and a second spool, and, where a rotational speed of a first spool of a first engine has been substantially synchronized with a rotational speed of a first spool of a second engine. The method comprises:

receiving an out-of-sync signal indicative of the second spool of the first engine and the second spool of the second engine having different rotational speeds;

determining, based on the out-of-sync signal, a bias to be added to a sensed parameter useful in controlling the first engine, the sensed parameter being indicative of one of altitude and a flow of bleed air from the first engine; and generating an output configured to instruct a controller of the first engine to use the bias with the sensed parameter for controlling the first engine to cause a change in rotational speed of the second spool of the first engine in relation to the rotational speed of the first spool of the first engine.

The out-of-sync signal may be indicative of a magnitude of the difference in rotational speeds.

The method may comprise determining the bias based on the sensed parameter.

The out-of-sync signal may be based on a vibration measurement acquired on the aircraft.

The out-of-sync signal may be based on an acoustic measurement acquired from inside of a cabin of the aircraft. The out-of-sync signal may be indicative of a period of audible beats inside of the cabin of the aircraft.

The out-of-sync signal may be based on a first vibration measurement acquired from the first engine and a second vibration measurement acquired from the second engine. The out-of-sync signal may be based on a combination of the first vibration measurement and of the second vibration measurement.

The method may comprise determining a preferred synchronization time based on the out-of-sync signal and generating the output based on the preferred synchronization time. The preferred synchronization time may correspond to a preferred phase angle between the second spool of the first engine and the second spool of the second engine. The out-of-sync signal may be indicative of a first time corresponding to a higher noise level and a second time corresponding to a lower noise level where the preferred synchronization time corresponds to the time of the lower noise level.

The method may comprise retrieving the bias from a look-up table.

The method may comprise determining the bias automatically using a feedback loop.

In another aspect, the disclosure describes a method for improving synchronization of two engines on an aircraft where each engine comprises a first spool and a second spool, and, where a rotational speed of a first spool of a first engine has been substantially synchronized with a rotational speed of a first spool of a second engine. The method comprises:

receiving acoustic feedback indicative of the second spool of the first engine and the second spool of the second engine having different rotational speeds;

determining, based on the acoustic feedback, a bias to be added to a sensed parameter useful in controlling the first engine; and generating an output configured to instruct a controller of the first engine to use the bias with the sensed parameter for controlling the first engine to thereby cause a change in rotational speed of the second spool of the first engine in relation to the rotational speed of the first spool of the first engine.

The sensed parameter may be indicative of a temperature of the air at an inlet of the first engine. The sensed parameter may be indicative of pressure altitude. The sensed parameter may be indicative of a flow of bleed air from the first engine.

The method may comprise determining the bias based on a value of the sensed parameter.

The acoustic feedback may be based on an acoustic measurement acquired inside of a cabin of the aircraft. The acoustic feedback may be indicative of a period of audible beats.

The method may comprise determining the bias automatically using a feedback loop.

The method may comprise determining a preferred synchronization time based on the acoustic feedback and generating the output based on the preferred synchronization time. The preferred synchronization time may correspond to a preferred phase angle between the second spool of the first engine and the second spool of the second engine. The acoustic feedback may be indicative of a first time corresponding to a higher noise level and a second time corresponding to a lower noise level where the preferred synchronization time corresponds to the time of the lower noise level.

In another aspect, the disclosure describes an apparatus for improving synchronization of two engines on an aircraft where each engine comprises a first spool and a second spool, and, where a rotational speed of a first spool of a first engine has been substantially synchronized with a rotational speed of a first spool of a second engine. The apparatus comprises:

an acoustic sensor configured to detect audible beats inside of an aircraft cabin;

a processor operationally coupled to receive signals indicative of the audible beats detected by the acoustic sensor; and a non-transitory storage medium including machine-readable instructions executable by the processor and configured to cause the processor to:

using the signals indicative of the audible beats detected by the acoustic sensor, determine a bias to be added to a sensed parameter useful in controlling the first engine to cause a change in rotational speed of the second spool of the first engine in relation to the rotational speed of the first spool of the first engine; and generating an output configured to instruct a controller of the first engine to use the bias with the sensed parameter for controlling the first engine.

The sensed parameter may be indicative of a temperature of the air at an inlet of the first engine. The sensed parameter may be indicative of pressure altitude. The sensed parameter may be indicative of a flow of bleed air from the first engine.

The instructions may be configured to cause the processor to determine the bias based on a value of the sensed parameter.

The instructions may be configured to cause the processor to determine the bias based on a period of the audible beats.

The instructions may be configured to cause the processor to determine a preferred synchronization time based on the audible beats and generate the output based on the preferred synchronization time. The preferred synchronization time may correspond to a preferred phase angle between the second spool of the first engine and the second spool of the second engine. The audible beats may be indicative of a first time corresponding to a higher noise level and a second time corresponding to a lower noise level where the preferred synchronization time corresponds to the time of the lower noise level.

In another aspect, the disclosure describes a method for improving synchronization of two engines on an aircraft where each engine comprises a first spool and a second spool, and, where a rotational speed of a first spool of a first engine has been substantially synchronized with a rotational speed of a first spool of a second engine. The method comprises:

receiving feedback indicative of the second spool of the first engine and the second spool of the second engine having different rotational speeds, the feedback being based on a first vibration measurement acquired from the first engine and a second vibration measurement acquired from the second engine;

determining, based on the feedback, a bias to be added to a sensed parameter useful in controlling the first engine; and generating an output configured to instruct a controller of the first engine to use the bias with the sensed parameter for controlling the first engine to thereby cause a change in rotational speed of the second spool of the first engine in relation to the rotational speed of the first spool of the first engine.

The sensed parameter may be indicative of a temperature of the air at an inlet of the first engine. The sensed parameter may be indicative of pressure attitude. The sensed parameter may be indicative of a flow of bleed air from the first engine.

The method may comprise determining the bias based on a value of the sensed parameter.

The feedback may be based on a combination of the first vibration measurement and of the second vibration measurement.

The method may comprise determining the bias automatically using a feedback loop.

The method may comprise determining a preferred synchronization time based on the feedback and generating the output based on the preferred synchronization time. The preferred synchronization time may correspond to a preferred phase angle between the second spool of the first engine and the second spool of the second engine. The feedback may be indicative of a first time corresponding to a higher noise level and a second time corresponding to a lower noise level where the preferred synchronization time corresponds to the time of the lower noise level.

In another aspect, the disclosure describes an apparatus for improving synchronization of two engines on an aircraft where each engine comprises a first spool and a second spool, and, where a rotational speed of a first spool of a first engine has been substantially synchronized with a rotational speed of a first spool of a second engine. The apparatus comprises:

a first vibration sensor configured to detect vibrations of the first engine;

a second vibration sensor configured to detect vibrations of the second engine;

a processor operationally coupled to receive signals indicative of the vibrations detected by the first and second vibration sensors; and a non-transitory storage medium including machine-readable instructions executable by the processor and configured to cause the processor to:

using the signals indicative of the vibrations detected by the first and second vibration sensors, determine a bias to be added to a sensed parameter useful in controlling the first engine to cause a change in rotational speed of the second spool of the first engine in relation to the rotational speed of the first spool of the first engine; and generating an output configured to instruct a controller of the first engine to use the bias with the sensed parameter for controlling the first engine.

The sensed parameter may be indicative of a temperature of the air at an inlet of the first engine. The sensed parameter may be indicative of pressure altitude. The sensed parameter may be indicative of a flow of bleed air from the first engine.

The instructions may be configured to cause the processor to determine the bias based on a value of the sensed parameter.

The instructions may be configured to cause the processor to determine the bias based on a combination of the vibrations detected by the first sensor with the vibrations detected by the second sensor.

The instructions may be configured to cause the processor to determine a preferred synchronization time based on the vibrations and generating the output based on the preferred synchronization time. The preferred synchronization time may correspond to a preferred phase angle between the second spool of the first engine and the second spool of the second engine. The vibrations may be indicative of a first time corresponding to a higher noise level and a second time corresponding to a lower noise level where the preferred synchronization time corresponds to the time of the lower noise level.

In another aspect, the disclosure describes a method for improving synchronization of two turbo-fan engines on an aircraft where each turbo-fan engine comprises a spool. The method comprises:

receiving feedback indicative of the spool of the first engine and the spool of the second engine having different rotational speeds;

generating an output configured to instruct a controller of the first engine to control the first engine to cause a change in rotational speed of the spool of the first engine in relation to the rotational speed of the spool of the second engine and substantially synchronize the spool of the first engine with the spool of the second engine; and determining a preferred synchronization time based on the feedback and generating the output based on the preferred synchronization time.

The preferred synchronization time may correspond to a preferred phase angle between the spool of the first engine and the spool of the second engine.

The feedback may be indicative of a first time corresponding to a higher noise level and a second time corresponding to a lower noise level, the preferred synchronization time corresponding to the time of the lower noise level.

In another aspect, the disclosure describes an aircraft comprising an apparatus as described herein.

Further details of these and other aspects of the subject matter of this application will be apparent from the detailed description and drawings included below.

DESCRIPTION OF THE DRAWINGS

Reference is now made to the accompanying drawings, in which:

FIGS. 5A and 5B show two plots illustrating unfiltered feedback and filtered feedback respectively for use with the apparatus of FIG. 4A or 4B;

FIG. 7 is a flow chart illustrating an exemplary method for improving synchronization of the two engines of the aircraft of FIG. 1;

FIG. 9 is a flow chart illustrating another exemplary method for improving synchronization of the two engines of the aircraft of FIG. 1; and FIG. 10 is a flow chart illustrating another exemplary method for improving synchronization of the two engines of the aircraft of FIG. 1.

DETAILED DESCRIPTION

Various aspects of the present disclosure may be useful for synchronizing two or more multi-spool engines on aircraft. In some embodiments, the apparatus and methods disclosed herein may be useful for improving synchronization of multi-spool aircraft engines that have already been synchronized using known (conventional) methods. For example, the apparatus and methods disclosed herein may be used to improve synchronization between the other spools of dual-spool aircraft engines which are typically not considered in known engine synchronization methods. Even though the present disclosure relates to synchronization of spools from separate aircraft engines, it should be noted that the apparatus and methods disclosed herein are intended to improve synchronization and not necessarily achieve absolute synchronization between the spools. In some situations, an improvement in synchronization may correspond to an increase in the period of audible beats inside of a cabin of an aircraft toward a range that is less disruptive (e.g., annoying) to passengers in order to improve passenger comfort.

Aspects of various embodiments are described below through reference to the drawings.

Figure 1:
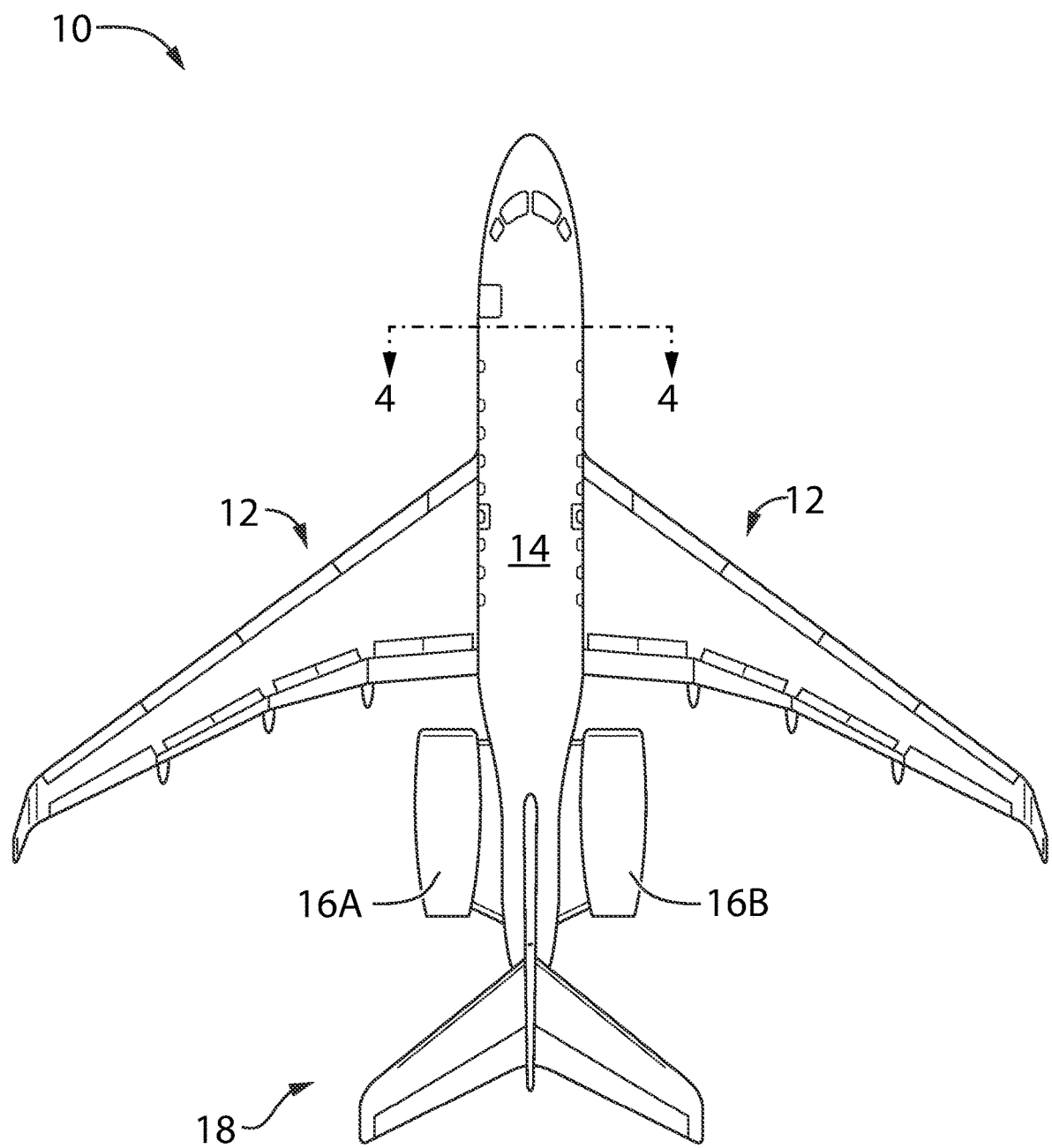
FIG. 1 is a top plan view of an exemplary aircraft comprising an apparatus for improving synchronization of two or more engines mounted thereto.

FIG. 1 is a top plan view of an exemplary aircraft 10 which may comprise one or more apparatus for improving synchronization of two or more engines mounted to aircraft 10. Aircraft 10 may be any type of aircraft such as corporate, private, commercial and passenger aircraft suitable for civil aviation. For example, aircraft 10 may be a narrow-body, twin-engine jet airliner. Aircraft 10 may be a fixed-wing aircraft or a rotary-wing aircraft comprising two or more engines. Aircraft 10 may comprise one or more wings 12, fuselage 14, two or more engines 16A, 16B and empennage 18. One or more of engines 16A, 16B may be mounted to fuselage 14. Alternatively, or in addition, one or more of engines 16A, 16B may be mounted to wings 12.

Figure 2:
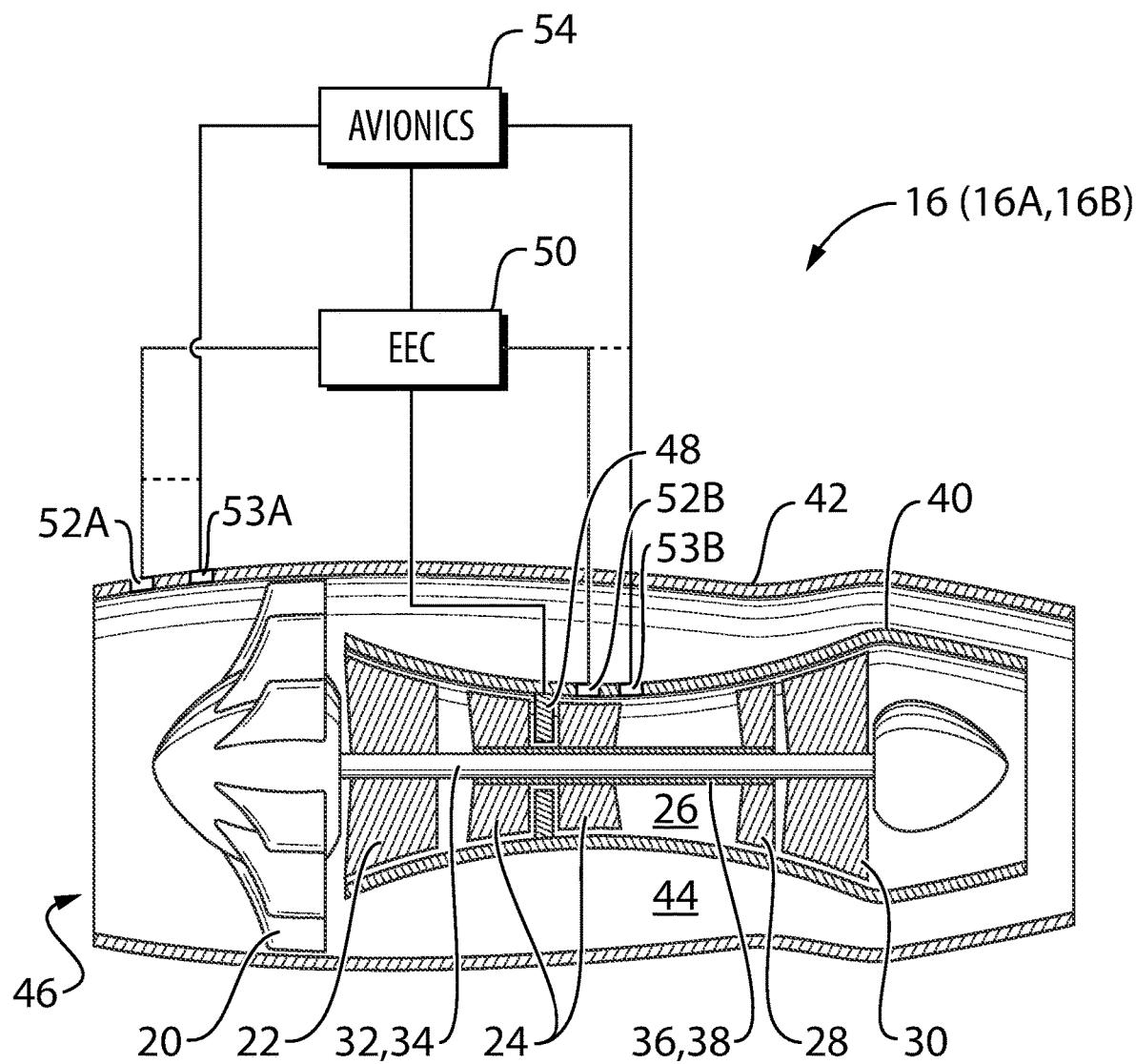
FIG. 2 shows a schematic axial cross-sectional view of an exemplary turbo-fan gas turbine engine of the aircraft of FIG. 1.

FIG. 2 shows a schematic axial cross-sectional view of one of aircraft engines 16A, 16B of aircraft 10 of FIG. 1. Both engines 16 of aircraft 10 may be substantially identical. For example, each engine 16 may be a turbo-fan gas turbine engine. The specific configuration of engine 16 illustrated in FIG. 2 is shown for example only and is not intended to be limiting. For example, various aspects of the present disclosure could also be applicable to other types of multi-spool engines including those of the turbo-shaft type. For example, engine 16 may be a dual-spool gas turbine engine.

Engine 16 may comprise fan 20 through which ambient air is propelled, low-pressure compressor 22 and high-pressure compressor 24 for pressurizing the air, combustor 26 in which the compressed air is mixed with fuel and ignited for generating an annular stream of hot combustion gases, high-pressure turbine section 28 and low-pressure turbine section 30 for extracting energy from the combustion gases. Fan 20, low-pressure compressor 22 and low-pressure turbine section 30 may be mechanically coupled together for common rotation via low-pressure shaft 32. Together, fan 20, low-pressure compressor 22, low-pressure turbine section 30 and low-pressure shaft 32 may be considered low-pressure spool 34 (referred hereinafter as "LP spool 34"). High-pressure compressor 24 and high-pressure turbine section 28 may be mechanically coupled together for common rotation via high-pressure shaft 36. Together, high-pressure compressor 24, high-pressure turbine section 28 and high-pressure shaft 36 may be considered high-pressure spool 38 (referred hereinafter as "HP spool 38"). Low-pressure shaft 32 and high-pressure shaft 36 may be independently rotatably supported so that LP spool 34 and HP spool 38 may rotate separately from each other at different rotational speeds and/or in different directions. For example, high-pressure shaft 36 may be hollow and low-pressure shaft 32 may extend through high-pressure shaft 36 and be mounted substantially coaxially thereto.

The portion of engine 16 in which low-pressure shaft 32 and high-pressure shaft 36 are housed may also be referred to as the "core" of engine 16 and may be delimited by casing 40. The annular passage surrounding casing 40 and being delimited by casing 42 may also be referred to as by-pass duct 44.

Low-pressure compressor 22 and high-pressure compressor 24 may together form a multi-stage compressor for pressurizing the air drawn into engine 16 via inlet 46. Engine 16 may comprise one or more stages of variable stator guide vanes 48 disposed within low-pressure 22 and/or high-pressure compressor 24. Variable stator guide vanes 48 may be actuatable so that their orientation relative to the flow of gas through the core of engine 16 may be varied depending on the environmental and/or operating conditions of engine 16. The actuation of variable stator guide vanes 48 may be controlled by an electronic engine controller 50 (referred hereinafter as "EEC 50").

EEC 50 may comprise one or more digital computers, data processors, microcontroller or other suitably programmed or programmable logic circuits and may form part of Full Authority Digital Engine Control (FADEC) of engine 16. EEC 50 and related accessories may control at least some aspects of performance of engine 16. EEC 50 may for example be configured to make decisions regarding the control of engine 16 and may be configured to provide optimum engine efficiency for a given flight condition. EEC 50 may receive one or more inputs and, based on the inputs, generate one or more signals useful in controlling some aspects of the operation of engine 16. For example, such inputs may include parameters measured/sensed via sensors 52A, 52B, 53A, 53B. Such sensed parameters may include environmental parameters or operational parameters associated with engine 16 and/or aircraft 10.

For example, sensor 52A may comprise a temperature sensor configured to provide a signal to EEC 50 that is indicative of the temperature of the air at inlet 46 of engine 16. For example, sensor 52A may comprise a total air temperature probe. Sensor 52B may be configured to provide an indication of an amount of air flow being bled from the compressor section of engine 16. For example, sensor 52B may provide an indication of flow rate of bleed air flow. In some embodiments, sensor 52B may comprise a pressure sensor. In some embodiments, sensor 52B may be a position sensor (e.g., linear variable differential transformer, rotary variable differential transformer) indicating the position of a bleed air valve.

For example, sensor 53A may comprise a vibration sensor (e.g., accelerometer) of known or other type configured to acquire measurements indicative of a vibration of outer engine casing 42. Similarly, sensor 53B may comprise a vibration sensor (e.g., accelerometer) of known or other type configured to acquire measurements indicative of a vibration of inner engine casing 40. In various embodiments, engines 16A, 16B may each comprise one or more of vibration sensors 53A, 53B.

EEC 50 may also be operatively coupled for data communication with aircraft avionics 54. For example, EEC 50 may receive parameters and/or instructions from aircraft avionics 54. EEC 50 may also transmit parameters and/or instructions to aircraft avionics 54. For example, EEC 50 may receive one or more sensed parameters such as pressure altitude from aircraft avionics 54.

Vibration sensors 53A, 53B may be coupled to EEC 50 so that vibration measurements acquired via such sensors may be available to EEC 50. Accordingly, the vibration measurements may also be available to aircraft avionics 54 via EEC 50. Alternatively or in addition, vibration sensors 53A, 53B may be coupled directly or indirectly to aircraft avionics 54 so that the vibration measurements acquired by vibration sensors 53A, 53B may be available to aircraft avionics 54 without going through EEC 50.

Based on one or more sensed parameters and other data available, EEC 50 may control the position of variable stator guide vanes 48 in order to control their impact on the flow of gas through the core of engine 16. During operation of engine 16, the adjustment of variable stator guide vanes 48 may result in a change in relative rotational speed between LP spool 34 and HP spool 38. Accordingly, changing the relationship in rotational speed between LP spool 34 and HP spool 38 may be achieved by adjusting variable stator guide vanes 48 and may be used to improve synchronization between the two engines 16A, 16B.

For example, in the case where a rotational speed N1 of LP spool 34 of first engine 16A has been substantially synchronized with a rotational speed N1 of LP spool 34 of second engine 16B, a change in the speed ratio N1/N2 between the rotational speed of LP spool 34 and HP spool 38 of one of the two engines 16A, 16B may be used to improve synchronization of the rotational speed N2 of HP spool 38 of the first engine 16A with the rotational speed N2 of HP spool 38 of the second engine 16B. As explained below, a bias (i.e., trim value) may be deliberately introduced in one or more of the parameters read by EEC 50 in order to "trick" EEC 50 into commanding a position of one or more variable stator guide vanes 48 that is slightly different than a position that would otherwise be commanded without the use of the bias. The magnitude of the bias may be selected to cause a desired change in the speed ratio N1/N2 and may be relatively minor so that it may not otherwise significantly affect the performance of engine 16A or 16B. In some embodiments, the methods disclosed herein may require no or minimal changes to the function of EEC 50 since the selection and introduction of a suitable bias to improve engine synchronization may carried out on the aircraft side (e.g., by aircraft avionics 54) so that no additional parameters or values may need to be provided to EEC 50. Accordingly, this approach may be used without requiring changes to normal/existing EEC 50 logic. Alternatively, some functions relating to engine synchronization that are described herein as being carried out by aircraft avionics 54 could be carried out by EEC 50 instead in some embodiments.

Figure 3:
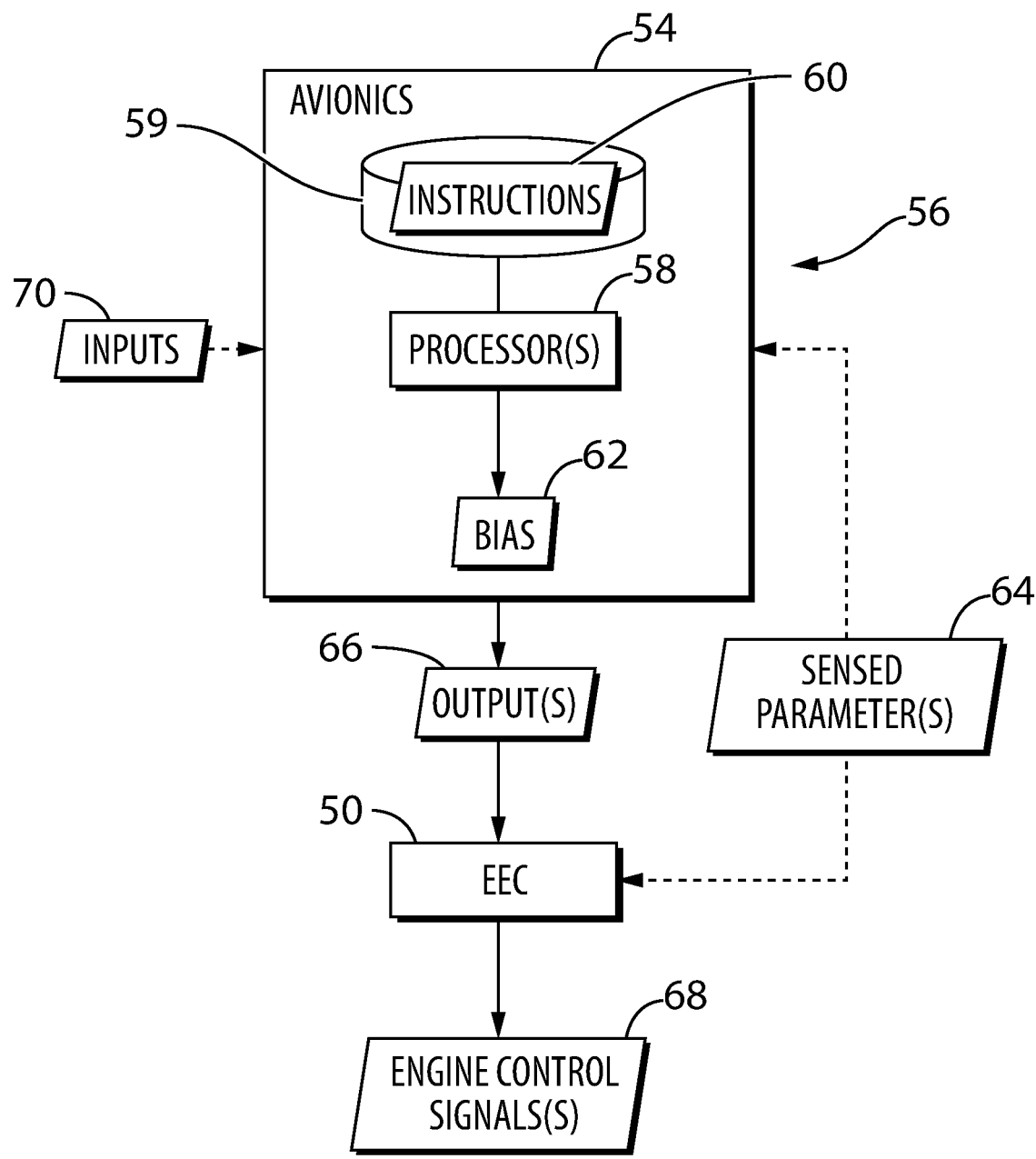
FIG. 3 is a schematic representation of an exemplary apparatus for improving synchronization of the two engines of the aircraft of FIG. 1.

FIG. 3 is a schematic representation of an exemplary apparatus 56 for improving synchronization of two engines 16A, 16B of aircraft 10 where each engine 16A, 16B comprises a first spool (e.g., one of LP spool 34 and HP spool 38) and a second spool (e.g., the other one of LP spool 34 and HP spool 38). Apparatus 56 may be used where a rotational speed (e.g., N1 or N2) of the first spool of first engine 16A has been substantially synchronized with a rotational speed (e.g., the corresponding N1 or N2) of a corresponding first spool of second engine 16B using a known method. For example, apparatus 56 and the methods described herein may be used to improve synchronization between the other spools of engines 16A, 16B that have not been synchronized using the existing known method. Even though the apparatus and methods are described in relation to two aircraft engines 16A, 16B, it should be noted that aspects of the present disclosure could be used for improving synchronization of more than two engines 16A, 16B.

Apparatus 56 may comprise one or more data processors 58 (referred hereinafter as "processor 58") and one or more machine-readable memory(ies) such as non-transitory storage medium/media 59 (referred hereinafter as "storage medium 59") including machine-readable instructions 60 executable by processor 58. Instructions 60 may be configured to cause processor 58 to determine (e.g., calculate) a suitable bias 62 to be added to sensed parameter 64 useful in controlling first engine 16A to cause a change in rotational speed N2 of the second spool of first engine 16A in relation to rotational speed N1 of the first spool of first engine 16A (i.e., change the ratio N1/N2 of one of engines 16A, 16B).

Processor 58 may be part of aircraft avionics 54 and may comprise or may be part of any suitable computer, programmable data processing apparatus, logic circuit or other devices to cause a series of operational steps to be performed to produce a computer implemented process based on instructions 60.

Various aspects of the present disclosure may be embodied as an apparatus, method or computer program product. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in storage medium 59 having computer readable program code (e.g., machine-readable instructions 60) embodied thereon. Any combination of one or more known or other storage medium 59 may be utilized for storing instructions 60 thereon.

Instructions 60 may comprise computer program code for carrying out operations for aspects of the present disclosure and may be written in any combination of one or more programming languages, including an object oriented programming language such as Java, Smalltalk, C++ or the like and conventional procedural programming languages, such as the "C" programming language or other programming languages. Instructions 60 may execute entirely or in part by processor 58. For example, in some embodiments, some or all of instructions 60 could be executed by EEC 50.

Depending on which sensed parameter 64 is used for the introduction of bias 62, sensed parameter 64 may be provided to aircraft avionics 54 and/or directly to EEC 50. Based on instructions 60, processor 58 may determine a suitable bias 62 to be added to sensed parameter 64 and a suitable output 66 may be provided to EEC 50. EEC 50 may use output 66 to carry out one or more control functions for engine 16. For example, EEC 50 may output one or more engine control signals 68. As described above, engine control signals 68 may serve to control the position of one or more variable stator guide vanes 48 and consequently cause a change in the rotational speed ratio N1/N2 between LP spool 34 and HP spool 38.

In some embodiments, one or more inputs 70 may be provided in order to determine bias 62. For example, input 70 may be provided by a pilot of aircraft 10 via a suitable interface inside the cockpit of aircraft 10 or input 70 may be provided by maintenance personnel via a maintenance terminal. In some embodiments, input 70 may be representative of bias 62 so that the value of bias 62 may be pre-selected and processor 58 may not need to determine the value of bias 62. In such cases, bias 62 may be simply passed along as output 66 to EEC 50 so that EEC 50 may add bias 62 to the corresponding sensed parameter 64 and control engine 16 accordingly. Alternatively, instructions 60 may be configured to cause processor 58 to add bias 62 to sensed parameter 64 and pass along the biased sensed parameter (i.e., sensed parameter 64+bias 62) as output 66 for EEC 50 to use.

The value of bias 62 may be based on one or more factors. For example, the value of bias 62 may be based on the nature of sensed parameter 64 (e.g., a temperature of the air at inlet 46, pressure altitude, a flow of bleed air). One or more suitable values for bias 62 may be determined empirically based on their corresponding effect on the N1/N2 ratio. Accordingly, values for bias 62 may be kept between acceptable limits so as to not otherwise significantly affect the operation of the corresponding engine 16A, 16B. Such limits may be stored in storage medium 59 for example and used by instructions 60 so as not to be exceeded. In some embodiments, a suitable warning or error code may be generated in case a bias 62 calculated by processor 58 is found to be outside of such limits. For example, in some situations, a bias 62 within the range of ±2° F. of the temperature of the air at inlet 46 may be sufficient to cause a change in N1/N2 ratio that improves synchronization.

In some cases, input 70 may be required only for initial or periodic setup to provide a suitable bias 62 for use in a plurality of subsequent flight cycles of aircraft 10 or for an entire phase of flight of aircraft 10. For example, the same bias 62 may be a suitable constant value that is used for a period of time during which no significant change in the condition of engines 16A, 16B occurs. In such instance, a constant value for bias 62 may be stored in storage medium 59 and used for as long as it is considered suitable to provide an acceptable improvement in engine synchronization. The value of bias 62 may be different for different sensed parameters 64 and may be different depending on the specific value of the particular sensed parameter 64. Accordingly, different values of bias 62 associated with different sensed parameters 64 may be stored in one or more look-up tables located in storage medium 59. Accordingly, instructions 60 may be configured to cause processor 58 to retrieve a suitable bias 62 from the look-up table(s) based on sensed parameter 64.

In some embodiments, input 70 may be continuously or intermittently provided or calculated so that a suitable bias 62 may be determined as needed. For example, input 70 may comprise or be based on a feedback signal that is indicative of the quality of the synchronization of engines 16A, 16B. Accordingly, input 70 may be part of a feedback loop in which bias 62 is determined based on input 70 and a desired set point for the quality of synchronization may be stored in storage medium 59 or also provided via input 70. For example, input 70 may comprise an out-of-sync signal indicating that the second spool of the first engine 16A and the second spool of the second engine 16B may have different rotational speeds. In some embodiments, such out-of-sync signal may indicate the existence of a difference in rotational speed and/or may provide some quantification of such difference in rotational speed. For example, in some embodiments, such out-of-sync signals may be based on a difference (e.g., in revolutions per minute determined using tachometers) in sensed rotational speeds for each second spool or may be based on acoustic feedback and/or vibration feedback as described below. In some embodiments, the value for bias 62 may be selected (e.g., from a look-up table stored on storage medium 59) or computed based on the out-of-sync signal.

Figure 4A:
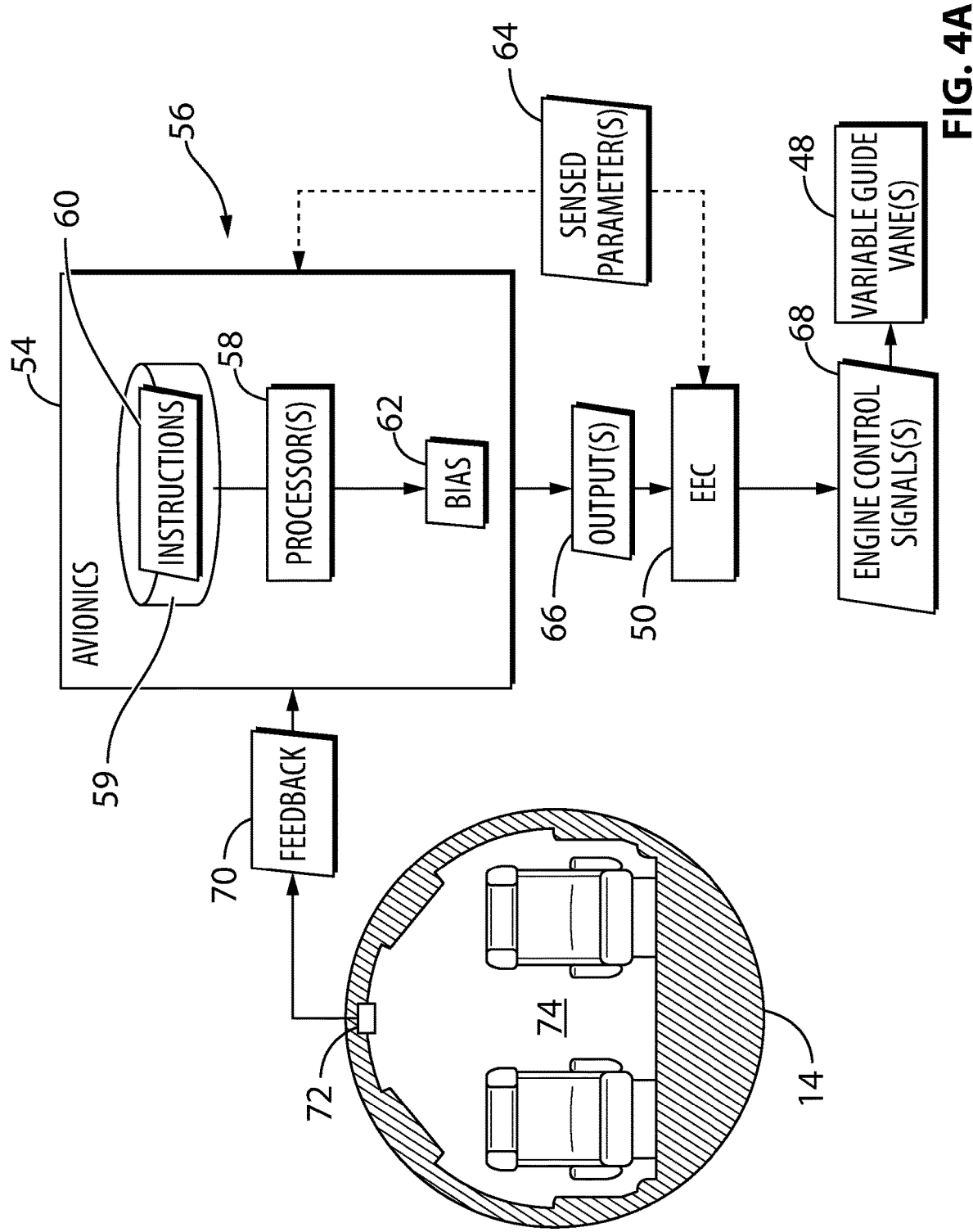
FIG. 4A is a schematic representation of another exemplary apparatus for improving synchronization of the two engines of the aircraft of FIG. 1 using acoustic feedback.

FIG. 4A is a schematic representation of another exemplary apparatus 56 for improving synchronization of two engines 16A, 16B on aircraft 10 of FIG. 1. In this particular embodiment, input 70 (from FIG. 3) is in the form of vibration or acoustic feedback measurement(s) (e.g., signal(s)) acquired via one or more sensors 72 (referred hereinafter as "sensor 72"). In the case of vibration feedback 70, sensor 72 may comprise a vibration sensor (e.g., accelerometer, position sensor, velocity sensor) that may be configured to sense vibrations of a component of aircraft 10. For example, sensor 72 may be configured to sense the vibration of an airframe component (e.g., interior wall of cabin 74) where such vibrations may be indicative of the difference in rotational speed of the second spool of each engine 16A, 16B. In the case of acoustic feedback 70, sensor 72 may be configured to capture noise from inside passenger cabin 74. In various embodiments, sensor 72 may comprise a microphone or an acoustic pressure sensor.

FIG. 4A also includes a cross-sectional view of fuselage 14 of aircraft 10 taken along line 4-4 of FIG. 1 illustrating the inside of cabin 74. In this embodiment, feedback 70 may provide some quantification of the difference in rotational speed of the second spool of each engine 16A, 16B not in terms of revolutions-per-minute but instead by way of noise beats that are audible from inside of passenger cabin 74 in the case of acoustic feedback 70. As mentioned above, audible noise beats may be annoying and affect passenger comfort especially if they have a relatively short period under five (5) seconds for example. Accordingly, apparatus 56 may be configured to extract a beat period from acoustic feedback 70 and use the beat period as a basis for determining a suitable bias 62 to sufficiently increase the beat period to a value that is less annoying to passengers. For example, it might be desirable to have a beat period higher than five (5) seconds or to substantially eliminate the noise beats. In some embodiments, acoustic feedback 70 may include other audible noises that are not relevant to engine synchronization and such other noises may be ignored or filtered out using known or other methods. In some embodiments, acoustic feedback 70 may be used to carry out phase adjustment between respective LP spools 34 and/or HP spools 38 as described below.

Figure 4B:
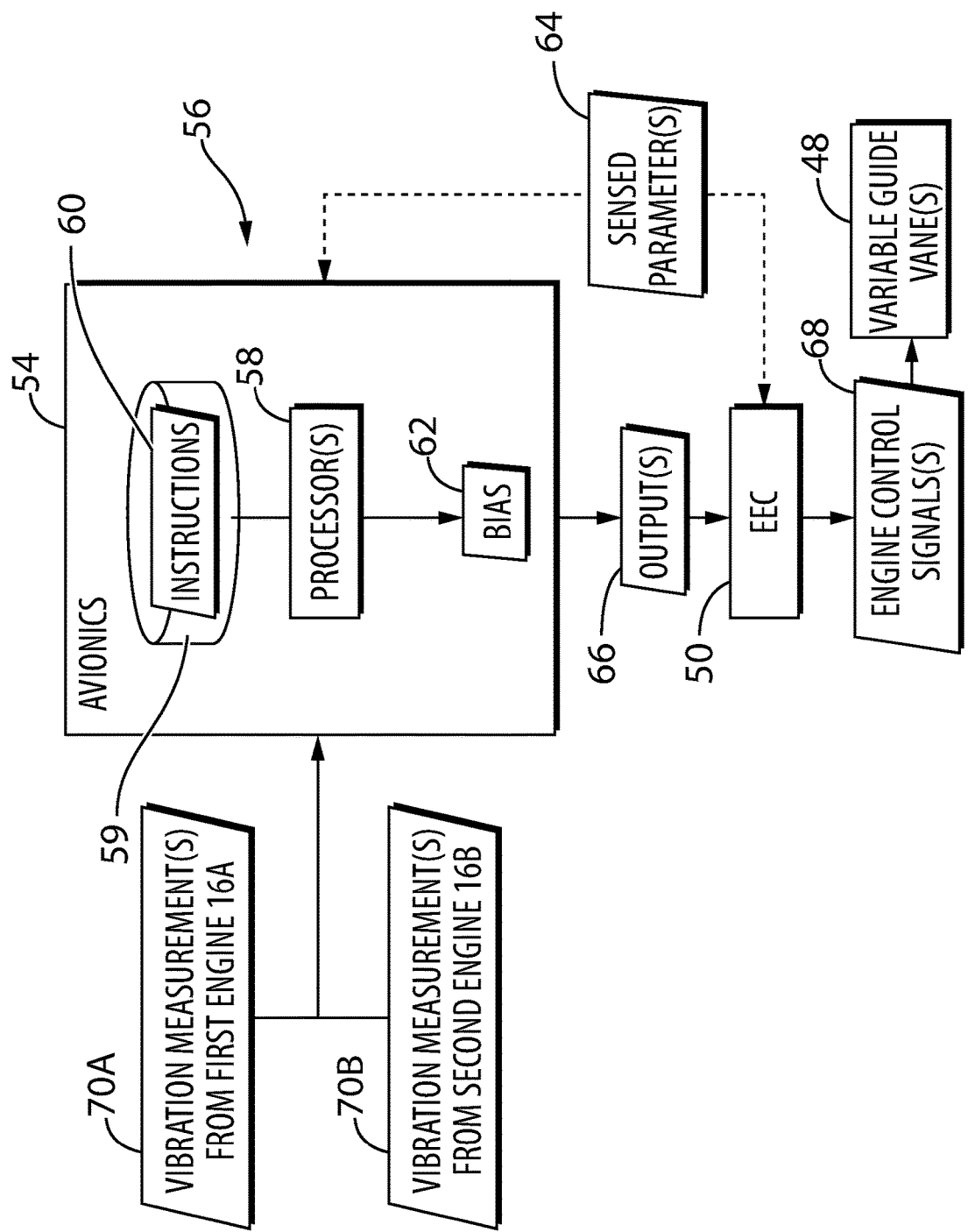
FIG. 4B is a schematic representation of another exemplary apparatus for improving synchronization of the two engines of the aircraft of FIG. 1 using vibration feedback.

FIG. 4B is a schematic representation of another exemplary apparatus 56 for improving synchronization of two engines 16A, 16B on aircraft 10 of FIG. 1. In this particular embodiment, input 70 (from FIG. 3) is in the form of vibration measurements 70A, 70B acquired via one or more of vibration sensors 53A and 53B of each engine 16A, 16B. Vibration measurements 70A, 70B may be indicative of the respective rotational speeds of respective LP spools 34 and/or HP spools 38 depending on the location of vibration sensors 53A and/or 53B. Accordingly, vibration measurements 70A, 70B may be used for the purpose of improving the synchronization of engines 16A, 16B as described herein. In various embodiments, vibration measurements 70A, 70B may be used in addition to or instead of the acoustic and/or vibration feedback 70 illustrated in FIG. 4A. In some situations, it may be desirable to apply some filtering according to known or other methods to vibration measurements 70A, 70B in order to extract data relevant for determining the difference in rotational speeds of respective LP spools 34 and/or HP spools 38 of the different engines 16A, 16B. In some embodiments, it may be desirable to combine vibration measurements 70A, 70B together in order to carry out phase adjustment between respective LP spools 34 and/or HP spools 38 as described below.

In various embodiments, apparatus 56 may be configured to continuously monitor feedback 70 and determine a bias 62 suitable for keeping the beat period sufficiently long, or, apparatus 56 may be selectively activated or deactivated by a pilot of aircraft 10 or maintenance personnel to determine a suitable constant bias 62 for subsequent use by EEC 50. For example, apparatus 56 may be activated to determine a new bias 62 when it is determined that the current bias 62 is no longer suitable.

FIGS. 5A and 5B show two plots illustrating unfiltered feedback 70 and filtered feedback 70 respectively. As explained above, some filtering may be carried out according to known or other methods on feedback 70 so as to extract relevant information from feedback 70. FIG. 5A shows exemplary unfiltered acoustic feedback 70 in the form of decibels plotted against time. FIG. 5B shows exemplary filtered acoustic feedback 70 in the form of decibels plotted against time. FIG. 5B more clearly shows beats 76 caused by amplitude modulation inside of aircraft cabin 74. Beats 76 may have an amplitude A and a period T as illustrated in FIG. 5B. Suitable filtering of feedback 70 may be conducted by apparatus 56. Alternatively, feedback 70 may be provided to apparatus 56 in filtered form. For example, a suitable band-pass filter may be applied to unfiltered feedback 70 at +/−10 Hz from the rotational speed of the applicable spool 34, 38 to be adjusted/controlled.

Even though the exemplary feedback shown in FIGS. 5A and 5B is specific to acoustic measurements, it is understood that the combination of the vibration signals 70A and 70B from first engine 16A and second engine 16B respectively or vibration feedback 70 from an airframe component could provide unfiltered and filtered feedback 70 functionally similar to that shown in FIGS. 5A and 5B. For example, it is understood that the combination of vibration measurements 70A, 70B could also be used to identify vibration beats that may correspond to and/or be associated with noise beats 76 shown in FIG. 5B.

Figure 6:
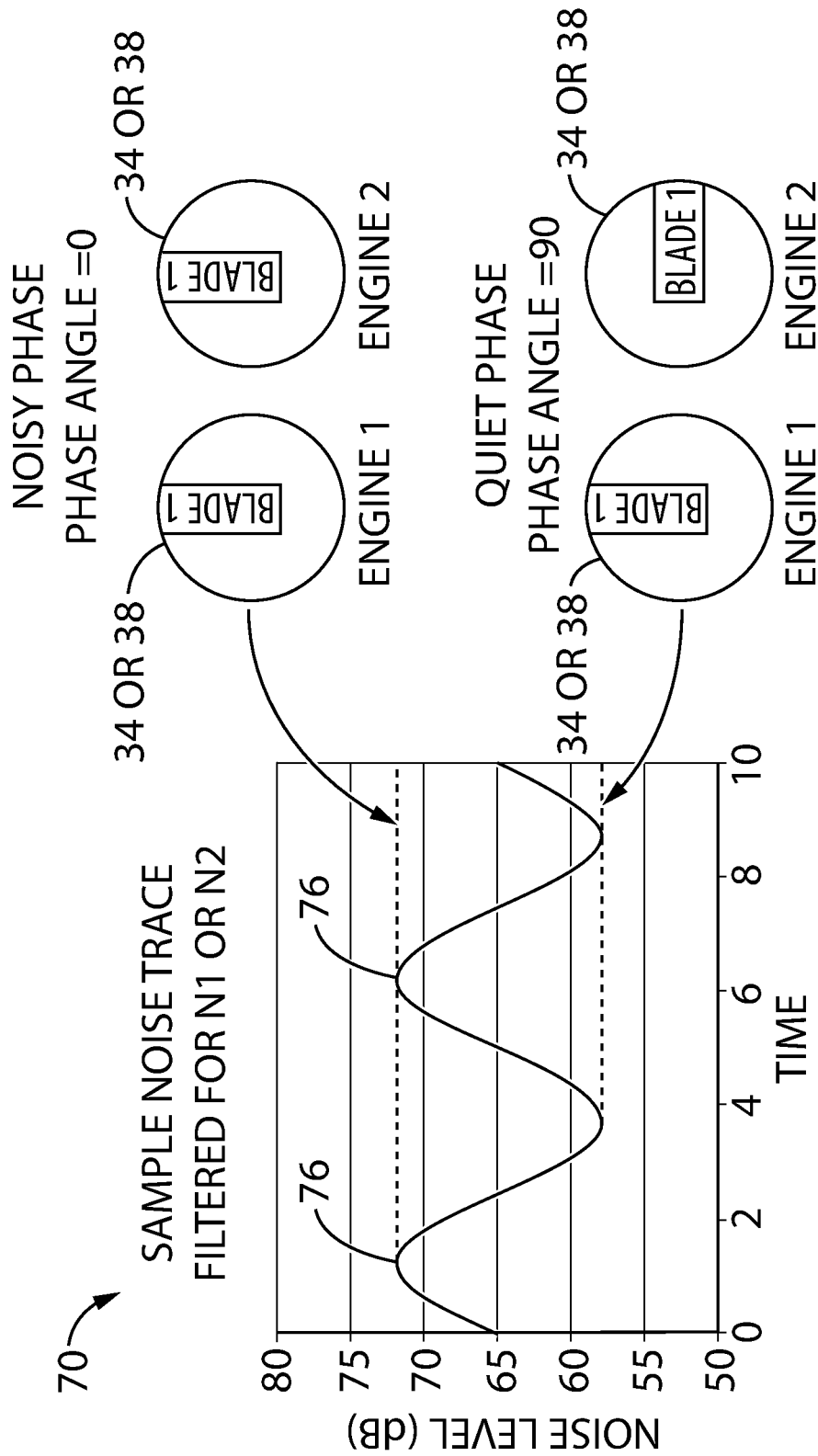
FIG. 6 illustrates phase adjustment of a spool of a first engine with a corresponding spool of a second engine.

FIG. 6 illustrates phase adjustment of LP spool 34 or HP spool 38 of first engine 16A with the corresponding LP spool 34 or HP spool 38 of second engine 16B. Phase adjustment can be done based on acoustic feedback 70, vibration feedback 70 and/or the combination of first vibration measurement 70A and second vibration measurement 70B as explained above. Phase adjustment may be done to obtain a lower noise level after synchronization of LP spools 34 and/or HP spools 38. For the purpose of the following explanation, acoustic noise is referenced but it is understood that vibration measurements 70A, 70B may also be used to achieve phase adjustment. Due to amplitude modulation, the filtered noise obtained via microphone 72 may exhibit beats 76 defining peaks of higher noise levels and troughs of lower noise level. Accordingly, if the synchronization of LP spools 34 and/or HP spools 38 is done at a time corresponding to a peak (higher noise level), then beats 76 may be reduced or eliminated but the resulting noise level may be that of the higher noise level (e.g., around 72 dB as shown in FIG. 6). Conversely, if the synchronization of LP spools 34 and/or HP spools 38 is done at a time corresponding to a trough (lower noise level), then beats 76 may still be reduced or eliminated but the resulting noise level may be that of the lower noise level (e.g., around 58 dB as shown in FIG. 6). The time at which speed synchronization of LP spools 34 and/or HP spools 38 is achieve (i.e., phase angle between LP spools 34 and/or HP spools 38) may affect the noise level after synchronization.

FIG. 6 illustrates an example where a phase angle of 0 degrees between LP spools 34 and/or HP spools 38 of two engines corresponds to a higher noise level and a phase angle of 90 degrees between LP spools 34 and/or HP spools 38 of the two engines corresponds to a lower noise level. Accordingly, it may be desirable to apply the synchronization of LP spools 34 and/or HP spools 38 at a time that substantially corresponds to the lower noise level in order to obtain a lower noise level after synchronization. In reference to FIGS. 3, 4A and 4B, the application of bias 62 and/or the generation or use of output 66 may be based on feedback 70 so that substantial synchronization may be achieved at a desired time to obtain a desired phase angle between LP spools 34 and/or HP spools 38 and thereby further reduce noise level.

FIG. 7 is a flow chart illustrating an exemplary method 700 for improving synchronization of two or more engines 16A, 16B on aircraft 10. Method 700 or part(s) thereof may be performed using apparatus 56 described above based at least in part on machine readable instructions 60. Alternatively, method 700 or part(s) thereof could be performed using an apparatus having a different configuration than those disclosed herein. Method 700 may be performed in conjunction with aircraft engines 16A, 16B that each have a first spool (e.g., one of LP spool 34 or HP spool 38) and a second spool (e.g., the other one of LP spool 34 or HP spool 38) where a rotational speed (e.g., N1 or N2) of the first spool of first engine 16A has already been substantially synchronized with a rotational speed (e.g., N1 or N2) of a corresponding first spool of second engine 16B using a known method.

As referenced herein, the first spools represent those that have already been synchronized using the known method and the second spools represent the other spools that are not taken into consideration by the known synchronization methods used to synchronize the first spools but that can still cause some issues (e.g., audible noise beats) if they are not sufficiently synchronized. The first and second spools referenced herein are not specifically tied to LP spool 34 and HP spool 38 respectively. For example, existing known synchronization methods may be based on either synchronizing LP spools 34 together or synchronizing HP spools 38 together. Accordingly, the first and second spools referenced herein may represent LP spools 34 or HP spools 38. Similarly, the first and second engines referenced herein are not respectively tied to any particular engine and do not imply any order but are referred to as such simply to distinguish between two engines 16A, 16B.

Method 700 may comprise: receiving a value of a sensed parameter 64 useful in controlling first engine 16A (see block 702); adding bias 62 to the value (see block 704) and using the biased value for controlling first engine 16A (see block 706). Sensed parameter 64 may be indicative of one of: a temperature of the air at inlet 46 of first engine 16A, pressure altitude and a flow of bleed air from first engine 16A. The control of first engine 16A may cause a change in rotational speed of the second spool of first engine 16A in relation to the rotational speed of the first spool of first engine 16A (i.e., change the ratio N1/N2) and thereby reduce the difference in rotational speed between the second spool of first engine 16A and the second spool of second engine 16B. Bias 62 may be determined based on sensed parameter 64.

Method 700 may comprise determining bias 62 based on a difference in rotational speed between the second spool of first engine 16A and the second spool of second engine 16B. As explained above, such indication of the difference in rotational speed may represent a quantification such as a different number of rotations per minute (RPM) or the period of audible noise beats for example. Accordingly, method 700 may comprise receiving acoustic feedback 70 based on an acoustic measurement acquired from inside of cabin 74 of the aircraft 10. Acoustic feedback 70 may be indicative of a period of audible beats. Bias 62 may be determined based on acoustic feedback 70.

Feedback 70 may be based on first vibration measurement 70A acquired from first engine 16A and second vibration measurement 70B acquired from second engine 16B. For example, feedback 70 may be based on a combination of first vibration measurement 70A and of second vibration measurement 70B.

As explained above, method 700 may comprise determining a preferred synchronization time based on feedback 70 and using biased value 62 for controlling first engine 16A based on the preferred synchronization time. The preferred synchronization time may correspond to a preferred phase angle between the second spool of first engine 16A and the second spool of second engine 16B. The preferred synchronization time may correspond to a time of lower noise level indicated by feedback 70.

Bias 62 may be determined automatically using a feedback loop. In various embodiments, bias 62 may be determined continuously or intermittently. In some embodiments, bias 62 may be a constant bias for use for an entire phase of flight or for a plurality of flight cycles of aircraft 10. In some embodiments, bias 62 may be received from a pilot of aircraft 10 or from maintenance personnel.

Figure 8:
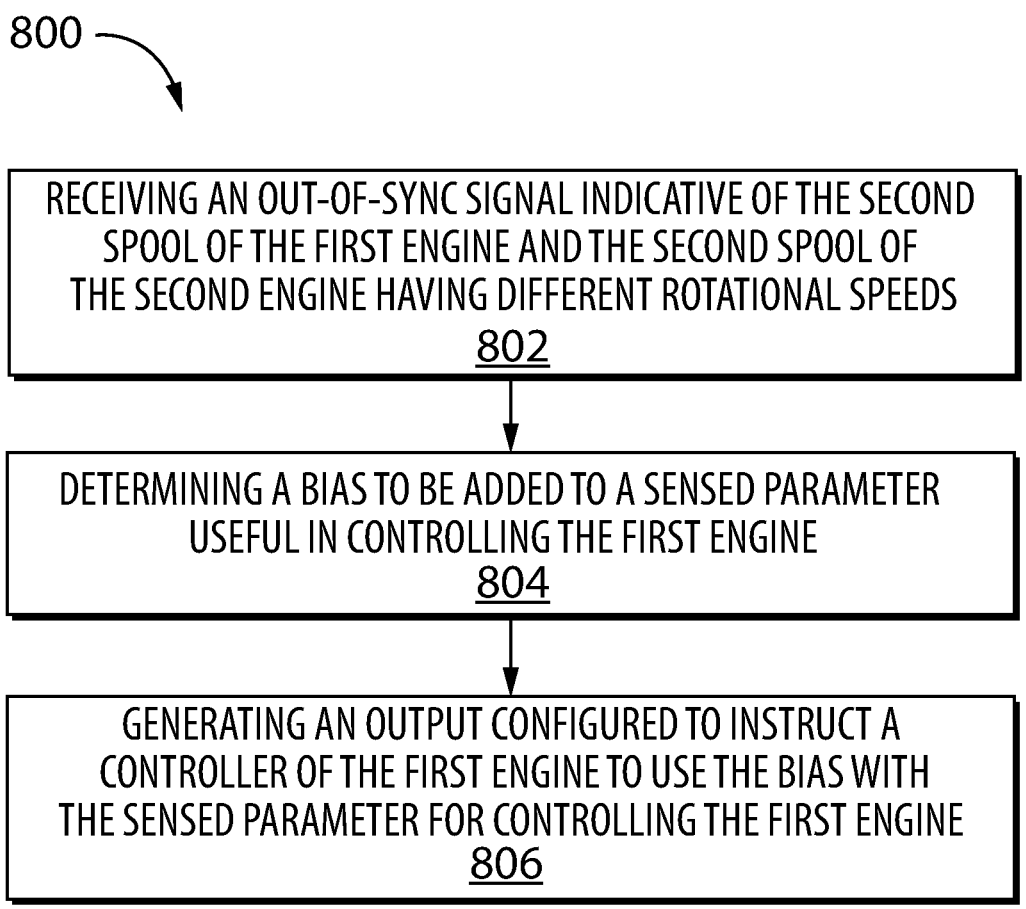
FIG. 8 is a flow chart illustrating another exemplary method for improving synchronization of the two engines of the aircraft of FIG. 1.

FIG. 8 is a flow chart illustrating another exemplary method 800 for improving synchronization of two or more engines 16A, 16B on aircraft 10. Aspects of method 700 described above may also apply to method 800 and vice versa. Method 800 or part(s) thereof may be performed using apparatus 56 described above based at least in part on machine readable instructions 60. Alternatively, method 800 or part(s) thereof could be performed using an apparatus having a different configuration than those disclosed herein. Method 800 may be performed in conjunction with aircraft engines 16A, 16B that each have a first spool (e.g., one of LP spool 34 or HP spool 38) and a second spool (e.g., the other one of LP spool 34 or HP spool 38) where a rotational speed (e.g., N1 or N2) of the first spool of first engine 16A has already been substantially synchronized with a rotational speed (e.g., N1 or N2) of a corresponding first spool of second engine 16B using a known method.

Method 800 may comprise: receiving an out-of-sync signal indicative of the second spool of first engine 16A and the second spool of second engine 16B having different rotational speeds (see block 802); based on the out-of-sync signal, determining bias 62 to be added to a sensed parameter 64 useful in controlling first engine 16A (see block 804); and generating output 66 configured to instruct EEC 50 of first engine 16A to use bias 62 with sensed parameter 64 for controlling first engine 16A (see block 806). As explained above, output 66 may transfer bias 62 and/or a biased sensed parameter (i.e., sensed parameter 64+bias 62) to EEC 50. Sensed parameter 64 may be indicative of one of: a temperature of the air at inlet 46 of first engine 16A, pressure altitude and a flow of bleed air from first engine 16A. Using bias 62 with sensed parameter 64 may cause a change in rotational speed of the second spool of first engine 16A in relation to the rotational speed of the first spool of first engine 16A (i.e., changing the ratio N1/N2). Bias 62 may be determined based on sensed parameter 64.

The out-of-sync signal may be indicative of a magnitude of a difference in rotational speeds. For example, the out-of-sync signal may be based on an acoustic measurement acquired from inside of cabin 74 of aircraft 10. For example, the out-of-sync signal may be indicative of a period of audible beats inside of cabin 74.

As explained above, bias 62 may be retrieved from a look-up table in storage medium 59. In some embodiments, bias may be determined automatically using a feedback loop.

FIG. 9 is a flow chart illustrating another exemplary method 900 for improving synchronization of two or more engines 16A, 16B on aircraft 10. Aspects of methods 700 and 800 described above may also apply to method 900 and vice versa. Method 900 or part(s) thereof may be performed using apparatus 56 described above based at least in part on machine readable instructions 60. Alternatively, method 900 or part(s) thereof could be performed using an apparatus having a different configuration than those disclosed herein. Method 900 may be performed in conjunction with aircraft engines 16A, 16B that each have a first spool (e.g., one of LP spool 34 or HP spool 38) and a second spool (e.g., the other one of LP spool 34 or HP spool 38) where a rotational speed (e.g., N1 or N2) of the first spool of first engine 16A has already been substantially synchronized with a rotational speed (e.g., N1 or N2) of a corresponding first spool of second engine 16B using a known method.

Method 900 may comprise: receiving acoustic feedback 70 indicative of the second spool of first engine 16A and the second spool of second engine 16B having different rotational speeds (see block 902); determining, based on acoustic feedback 70, bias 62 to be added to sensed parameter 64 useful in controlling first engine 16A (see block 904); and generating output 66 configured to instruct EEC 50 of first engine 16A to use bias 62 with sensed parameter 64 for controlling first engine 16A to thereby cause a change in rotational speed of the second spool of first engine 16A in relation to the rotational speed of the first spool of first engine 16A (see block 906). As explained above, output 66 may transfer bias 62 and/or a biased sensed parameter (i.e., sensed parameter 64+bias 62) to EEC 50.

In various embodiments, sensed parameter 64 may be indicative of one of: a temperature of the air at inlet 46 of first engine 16A, pressure altitude and a flow of bleed air from first engine 16A. Again, bias 62 may be determined based on a value of sensed parameter 64.

Acoustic feedback 70 may be based on an acoustic measurement acquired inside of cabin 74 of aircraft 10. For example, acoustic feedback 70 may be indicative of a period of audible beats and may be used to determine bias 62 automatically in a feedback loop in order to maintain the period of audible beats measured within a range that is less disruptive to passengers.

FIG. 10 is a flow chart illustrating another exemplary method 1000 for improving synchronization of two or more engines 16A, 16B on aircraft 10. Aspects of methods 700, 800 and 900 described above may also apply to method 1000 and vice versa. Method 1000 or part(s) thereof may be performed using apparatus 56 described above based at least in part on machine readable instructions 60. Alternatively, method 1000 or part(s) thereof could be performed using an apparatus having a different configuration than those disclosed herein. Method 1000 may be performed in conjunction with aircraft engines 16A, 16B that each have a first spool (e.g., one of LP spool 34 or HP spool 38) and a second spool (e.g., the other one of LP spool 34 or HP spool 38) where a rotational speed (e.g., N1 or N2) of the first spool of first engine 16A has already been substantially synchronized with a rotational speed (e.g., N1 or N2) of a corresponding first spool of second engine 16B using a known method.

Method 1000 may comprise: receiving feedback 70 indicative of the second spool of first engine 16A and the second spool of second engine 16B having different rotational speeds (see block 1002) where feedback 70 is based on first vibration measurement 70A acquired from first engine 16A and second vibration measurement 70B acquired from second engine 16B; determining, based on feedback 70, bias 62 to be added to sensed parameter 64 useful in controlling first engine 16A (see block 1004); and generating output 66 configured to instruct EEC 50 of first engine 16A to use bias 62 with sensed parameter 64 for controlling first engine 16A to thereby cause a change in rotational speed of the second spool of first engine 16A in relation to the rotational speed of the first spool of first engine 16A.

Feedback 70 may be based on a combination of first vibration measurement 70A and of second vibration measurement 70B.

Method 1000 may comprise determining a preferred synchronization time based on feedback 70 and using biased value 62 for controlling first engine 16A based on the preferred synchronization time. The preferred synchronization time may correspond to a preferred phase angle between the second spool of first engine 16A and the second spool of second engine 16B. The preferred synchronization time may correspond to a time of lower noise level indicated by feedback 70.

It is understood that the phase adjustment methods disclosed herein could also be used to improve the synchronization of a first spool of first engine 16A with a first spool of second engine 16B. For example, the phase adjustment methods may be used to improve synchronization of two turbo-fan engines 16A, 16B on aircraft 10 where each turbo-fan engine comprises a spool 34, 38. Such method may comprise: receiving feedback 70 indicative of spool 34 or 38 of first engine 16A and spool 34 or 38 of second engine 16B having different rotational speeds; generating output 66 configured to instruct EEC 50 of first engine 16A to control first engine 16A to cause a change in rotational speed of spool 34 or 38 of first engine 16A in relation to the rotational speed of spool 34 or 38 of second engine 16B and substantially synchronize spool 34 or 38 of first engine 16A with spool 34 or 38 of second engine 16B; and determining a preferred synchronization time based on feedback 70 and generating output 66 based on the preferred synchronization time.

The preferred synchronization time may correspond to a preferred phase angle between spool 34 or 38 of first engine 16A and spool 34 or 38 of second engine 16B. Feedback 70 may be indicative of a first time corresponding to a higher noise level and a second time corresponding to a lower noise level. The preferred synchronization time may correspond to the time of the lower noise level.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, while the apparatus, components and methods disclosed and shown herein may comprise a specific number of elements, the apparatus, components and methods could be modified to include additional or fewer of such elements. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for improving synchronization of two engines on an aircraft where each engine comprises a first spool and a second spool, and, where a rotational speed of a first spool of a first engine has been substantially synchronized with a rotational speed of a first spool of a second engine, the method comprising:
    receiving feedback indicative of the second spool of the first engine and the second spool of the second engine having different rotational speeds, the feedback being based on a first vibration measurement acquired from the first engine and a second vibration measurement acquired from the second engine;
    determining, based on the feedback, a bias to be added to a sensed parameter useful in controlling the first engine; and
    generating an output configured to instruct a controller of the first engine to use the bias with the sensed parameter for controlling the first engine to thereby cause a change in rotational speed of the second spool of the first engine in relation to the rotational speed of the first spool of the first engine.

2. The method as defined in claim 1, wherein the sensed parameter is indicative of a temperature of the air at an inlet of the first engine.

3. The method as defined in claim 1, wherein the sensed parameter is indicative of pressure altitude.

4. The method as defined in claim 1, wherein the sensed parameter is indicative of a flow of bleed air from the first engine.

5. The method as defined in claim 1, comprising determining the bias based on a value of the sensed parameter.

6. The method as defined in claim 1, wherein the feedback is based on a combination of the first vibration measurement and of the second vibration measurement.

7. The method as defined in claim 1, comprising determining the bias automatically using a feedback loop.

8. The method as defined in claim 1, comprising determining a preferred synchronization time based on the feedback and generating the output based on the preferred synchronization time.

9. The method as defined in claim 8, wherein the preferred synchronization time corresponds to a preferred phase angle between the second spool of the first engine and the second spool of the second engine.

10. The method as defined in claim 8, wherein the feedback is indicative of a first time corresponding to a higher noise level and a second time corresponding to a lower noise level, the preferred synchronization time corresponding to the time of the lower noise level.

11. An apparatus for improving synchronization of two engines on an aircraft where each engine comprises a first spool and a second spool, and, where a rotational speed of a first spool of a first engine has been substantially synchronized with a rotational speed of a first spool of a second engine, the apparatus comprising:
    a first vibration sensor configured to detect vibrations of the first engine;

a second vibration sensor configured to detect vibrations of the second engine;

a processor operationally coupled to receive signals indicative of the vibrations detected by the first and second vibration sensors; and a non-transitory storage medium including machine-readable instructions executable by the processor and configured to cause the processor to:

using the signals indicative of the vibrations detected by the first and second vibration sensors, determine a bias to be added to a sensed parameter useful in controlling the first engine to cause a change in rotational speed of the second spool of the first engine in relation to the rotational speed of the first spool of the first engine; and generating an output configured to instruct a controller of the first engine to use the bias with the sensed parameter for controlling the first engine.

12. The apparatus as defined in claim 11, wherein the sensed parameter is indicative of a temperature of the air at an inlet of the first engine.

13. The apparatus as defined in claim 11, wherein the sensed parameter is indicative of pressure altitude.

14. The apparatus as defined in claim 11, wherein the sensed parameter is indicative of a flow of bleed air from the first engine.

15. The apparatus as defined in claim 11, wherein the instructions are configured to cause the processor to determine the bias based on a value of the sensed parameter.

16. The apparatus as defined in claim 11, wherein the instructions are configured to cause the processor to determine the bias based on a combination of the vibrations detected by the first sensor with the vibrations detected by the second sensor.

17. The apparatus as defined in claim 11, wherein the instructions are configured to cause the processor to determine a preferred synchronization time based on the vibrations and generate the output based on the preferred synchronization time.

18. The apparatus as defined in claim 17, wherein the preferred synchronization time corresponds to a preferred phase angle between the second spool of the first engine and the second spool of the second engine.

19. The apparatus as defined in claim 17, wherein the vibrations are indicative of a first time corresponding to a higher noise level and a second time corresponding to a lower noise level, the preferred synchronization time corresponding to the time of the lower noise level.

20. An aircraft comprising the apparatus as defined in claim 11.

21. A method for improving synchronization of two turbo-fan engines on an aircraft where each turbo-fan engine comprises a spool, the method comprising:

receiving feedback indicative of the spool of the first engine and the spool of the second engine having different rotational speeds;

generating an output configured to instruct a controller of the first engine to control the first engine to cause a change in rotational speed of the spool of the first engine in relation to the rotational speed of the spool of the second engine and substantially synchronize the spool of the first engine with the spool of the second engine; and determining a preferred synchronization time based on the feedback and generating the output based on the preferred synchronization time.

22. The method as defined in claim 21, wherein the preferred synchronization time corresponds to a preferred phase angle between the spool of the first engine and the spool of the second engine.

23. The method as defined in claim 21, wherein the feedback is indicative of a first time corresponding to a higher noise level and a second time corresponding to a lower noise level, the preferred synchronization time corresponding to the time of the lower noise level.

* * * * *